United States Patent
Xiao et al.

(10) Patent No.: US 10,141,559 B2
(45) Date of Patent: Nov. 27, 2018

(54) POROUS INTERLAYER FOR A LITHIUM-SULFUR BATTERY

(71) Applicant: GM GLOBAL TECHNOLOGY OPERATIONS LLC, Detroit, MI (US)

(72) Inventors: Qiangfeng Xiao, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 206 days.

(21) Appl. No.: 15/091,331

(22) Filed: Apr. 5, 2016

(65) Prior Publication Data

US 2016/0218342 A1 Jul. 28, 2016

Related U.S. Application Data

(63) Continuation of application No. 14/052,032, filed on Oct. 11, 2013, now Pat. No. 9,373,829.

(51) Int. Cl.
*H01M 2/16* (2006.01)
*H01M 2/14* (2006.01)
(Continued)

(52) U.S. Cl.
CPC ......... *H01M 2/1686* (2013.01); *H01M 2/145* (2013.01); *H01M 2/162* (2013.01); *H01M 2/166* (2013.01); *H01M 2/1613* (2013.01); *H01M 2/1646* (2013.01); *H01M 2/1653* (2013.01); *H01M 4/13* (2013.01); *H01M 10/052* (2013.01); *Y02E 60/122* (2013.01)

(58) Field of Classification Search
CPC ........ H01M 4/13; H01M 2/16; H01M 10/052; H01M 2/14
See application file for complete search history.

(56) References Cited

U.S. PATENT DOCUMENTS 6,908,706 B2 6/2005 Choi et al.
8,663,840 B2 3/2014 Nazri et al.
(Continued)

FOREIGN PATENT DOCUMENTS

CN 1224120 C 10/2005
CN 103050667 A 4/2013
(Continued)

OTHER PUBLICATIONS

Manthiram, et al.; "Lithium-Sulfur Batteries with Porous Carbon Interlayer Configurations"; Abstract # 525; 223rd ECS Meeting; May 12-16, 2013.
(Continued)

*Primary Examiner* — Kenneth J Douyette
(74) *Attorney, Agent, or Firm* — Harness, Dickey & Pierce, P.L.C.

(57) ABSTRACT

A porous interlayer for a lithium-sulfur battery includes an electronic component and a negatively charged or chargeable lithium ion conducting component. The electronic component is selected from a carbon material, a conductive polymeric material, and combinations thereof. In an example, the porous interlayer may be disposed between a sulfur-based positive electrode and a porous polymer separator in a lithium-sulfur battery. In another example, the porous interlayer may be formed on a surface of a porous polymer separator.

14 Claims, 4 Drawing Sheets

(51) Int. Cl.
*H01M 10/052* (2010.01)
*H01M 4/13* (2010.01)

(56) References Cited

U.S. PATENT DOCUMENTS

| | | |
|---|---|---|
| 8,974,946 B2 | 3/2015 | Cai et al. |
| 8,999,584 B2 | 4/2015 | Jiang et al. |
| 9,028,565 B2 | 5/2015 | Huang |
| 9,093,705 B2 | 7/2015 | Xiao et al. |
| 9,123,939 B2 | 9/2015 | Xiao et al. |
| 9,142,830 B2 | 9/2015 | Xiao et al. |
| 9,153,819 B2 | 10/2015 | Huang et al. |
| 9,160,036 B2 | 10/2015 | Yang et al. |
| 9,252,411 B2 | 2/2016 | Abd Elhamid et al. |
| 9,350,046 B2 | 5/2016 | Huang |
| 9,362,551 B2 | 6/2016 | Sachdev et al. |
| 9,362,552 B2 | 6/2016 | Sohn et al. |
| 9,373,829 B2 | 6/2016 | Xiao et al. |
| 9,455,430 B2 | 9/2016 | Huang et al. |
| 9,537,144 B2 | 1/2017 | Huang et al. |
| 2002/0031706 A1* | 3/2002 | Dasgupta ............... H01M 4/13 429/212 |
| 2004/0126653 A1 | 7/2004 | Visco et al. |
| 2004/0197641 A1 | 10/2004 | Visco et al. |
| 2010/0261050 A1 | 10/2010 | Kang et al. |
| 2011/0269007 A1 | 11/2011 | Visco et al. |
| 2012/0164513 A1 | 6/2012 | Peng et al. |
| 2012/0229096 A1 | 9/2012 | Nazri |
| 2012/0231321 A1 | 9/2012 | Huang et al. |
| 2013/0284338 A1 | 10/2013 | Xiao et al. |
| 2014/0272526 A1 | 9/2014 | Huang |
| 2014/0272558 A1 | 9/2014 | Xiao et al. |
| 2015/0014890 A1 | 1/2015 | Xiao |
| 2016/0111721 A1 | 4/2016 | Xiao et al. |

FOREIGN PATENT DOCUMENTS

| | | |
|---|---|---|
| CN | 103515646 A | 1/2014 |
| CN | 104577060 A | 4/2015 |
| DE | 102014114439 A1 | 4/2015 |

OTHER PUBLICATIONS

Su, et al.; "A new approach to improve cycle performance of rechargeable lithium-sulfur batteries by inserting a free-standing MWCNT interlayer"; ChemComm; 2012; 48; 8817-8819.

Bruce et al. "Li—$O_2$ and Li—S batteries with high energy storage", *Nature Materials*, 11, 19-29 (2012).

Akridge et al., "Li/S fundamental chemistry and application to high-performance rechargeable batteries", *Solid State Ionics*, 175 (2004) 243-245.

Lee et al. "Surface-Initiated Growth of Thin Oxide Coatings for Li-Sulfur Battery Cathodes", *Adv. Energy Mater.* 2012, 2, 1490-1496.

First Office Action for Chinese Application No. 201410530011.0 dated Apr. 1, 2016 with English translation; 22 pages.

Su et al.; "Lithium-sulphur batteries with a microporous carbon paper as a bifunctional interlayer"; Nature Communications 3; Nov. 6, 2012; 6 pages.

Second Office Action for Chinese Application No. 2014105300011.0 dated Jun. 1, 2017 with English translation; 15 pages.

\* cited by examiner

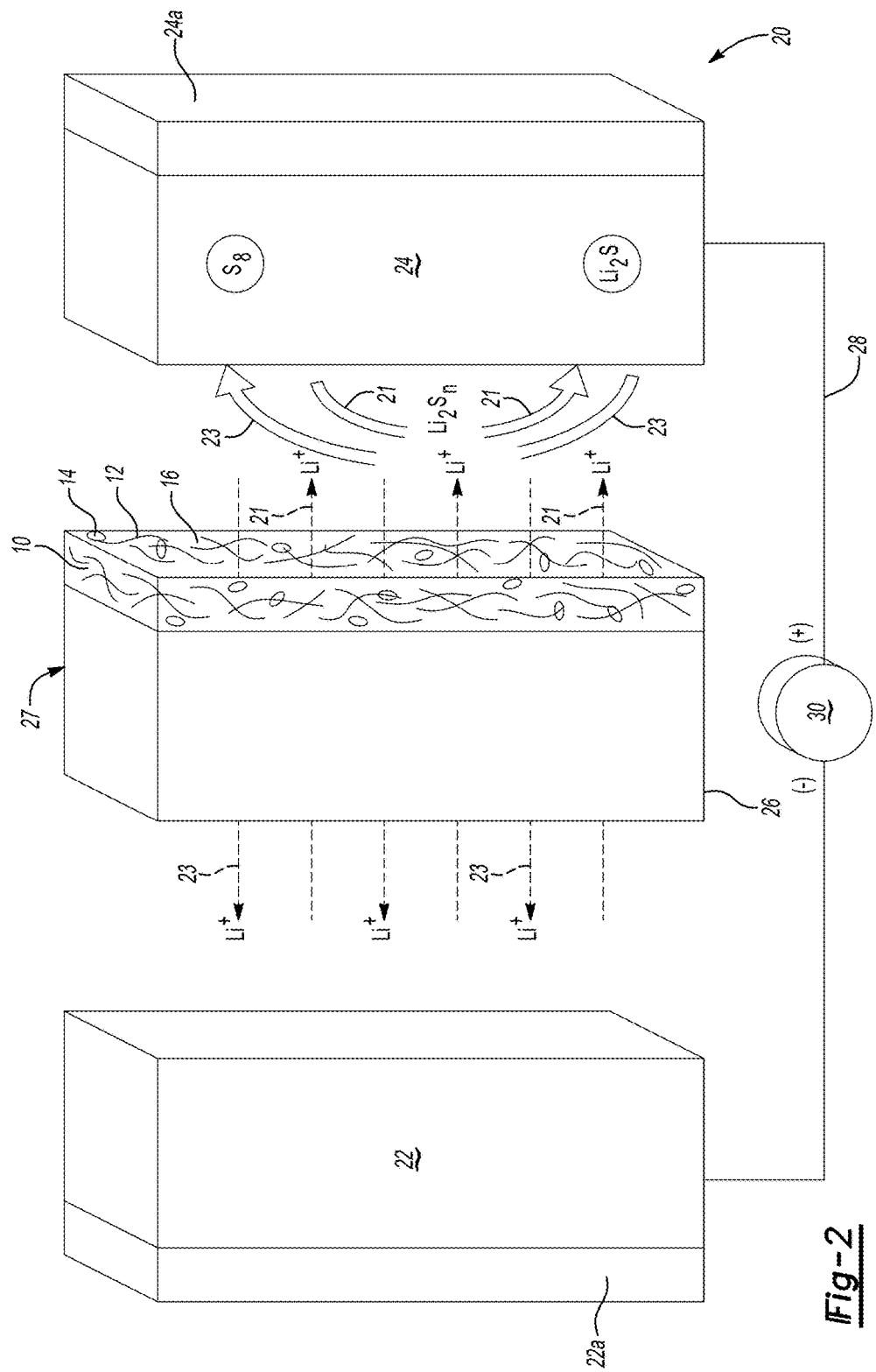

POROUS INTERLAYER FOR A LITHIUM-SULFUR BATTERY

CROSS-REFERENCE TO RELATED APPLICATIONS

This application is a continuation of U.S. application Ser. No. 14/052,032, filed Oct. 11, 2013, now U.S. Pat. No. 9,373,829, which is incorporated by reference herein in its entirety.

TECHNICAL FIELD

The present disclosure relates generally to a porous interlayer for a lithium-sulfur battery.

BACKGROUND

Secondary, or rechargeable, lithium-sulfur batteries are often used in many stationary and portable devices, such as those encountered in the consumer electronic, automobile, and aerospace industries. The lithium class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium batteries to undergo repeated cycling over their useful lifetimes makes them attractive and dependable electrical energy storage devices.

SUMMARY

A porous interlayer for a lithium-sulfur battery includes an electronic component and a negatively charged or chargeable lithium ion conducting component. The electronic component is selected from a carbon material, a conductive polymeric material, and combinations thereof. In an example, the porous interlayer may be disposed between a sulfur-based positive electrode and a porous polymer separator in a lithium-sulfur battery. In another example, the porous interlayer may be formed on a surface of a porous polymer separator.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 2 is a schematic, perspective view of an example of a lithium-sulfur battery showing a charging and discharging state, the battery including an example of the porous interlayer according to the present disclosure;

It is to be understood that the components shown in FIG. 2 are depicted to illustrate the flow of lithium ions between the negative and positive electrodes of the lithium-sulfur battery, and thus are not necessarily drawn to scale.

DETAILED DESCRIPTION

Lithium-sulfur batteries generally operate by reversibly passing lithium ions between a negative electrode (sometimes called an anode) and a positive electrode (sometimes called a cathode). The negative and positive electrodes are situated on opposite sides of a porous polymer separator soaked with an electrolyte solution that is suitable for conducting the lithium ions. Each of the electrodes is also associated with respective current collectors, which are connected by an interruptible external circuit that allows an electric current to pass between the negative and positive electrodes.

It has been found that the lithium-sulfur battery life cycle may be limited by the migration, diffusion, or shuttling of polysulfides from the sulfur cathode during the battery discharge process, through the porous polymer separator, to the anode. The $S_X$ polysulfides generated at the cathode are soluble in the electrolyte, and can migrate to the anode (e.g., a lithium electrode) where they react with the anode in a parasitic fashion to generate lower-order polysulfides. These lower-order polysulfides diffuse back to the cathode and regenerate the higher forms of polysulfide. As a result, a shuttle effect takes place. This shuttle effect leads to decreased sulfur utilization, self-discharge, poor cycleability, and reduced Coulombic efficiency of the battery. It is believed that even a small amount of polysulfide at the anode can lead to parasitic loss of active lithium at the anode, which prevents reversible electrode operation and reduces the useful life of the lithium-sulfur battery.

In the examples disclosed herein, the diffusive polysulfide of the lithium-sulfur battery may be mitigated by incorporating a porous interlayer between the porous polymer separator and the cathode of the lithium-sulfur battery. The porous interlayer includes an electronic component for conducting electrons and a negatively charged component for conducting lithium ions while repelling polysulfides. In addition to reducing or eliminating the shuttle effect, the porous interlayer also improves the utilization of active materials within the lithium-sulfur battery. This can lead to the lithium-sulfur battery exhibiting enhanced capacity, and thus a long useful life. The lithium-sulfur battery disclosed herein also maintains the sulfur cathode plateau voltage without sacrificing energy density, and exhibits a small internal resistance.

Figure 1A:
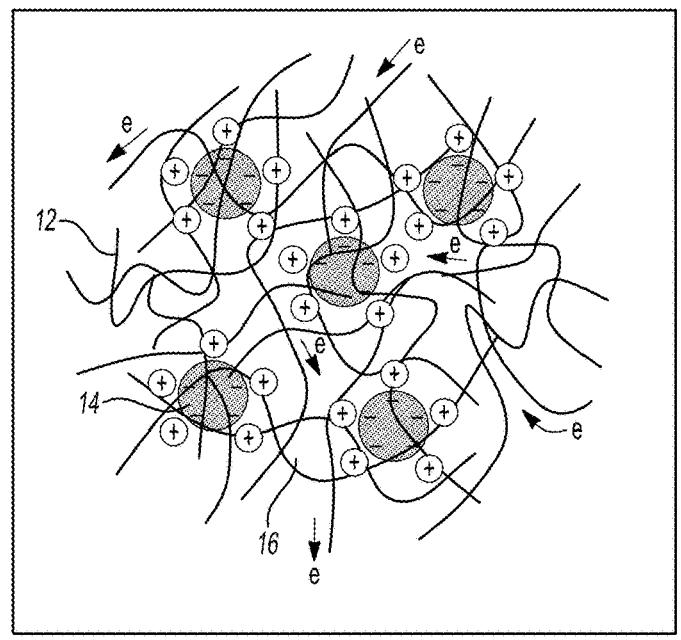
FIG. 1A is a schematic, cross-sectional view of an example of a free standing porous interlayer including a fibrous electronic component and a negatively charged lithium ion conducting component bound thereto.
Figure 1B:
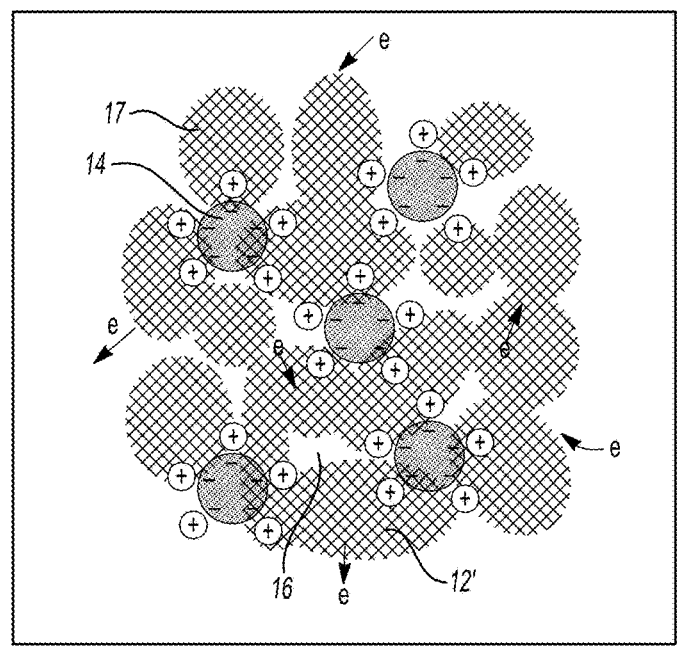
FIG. 1B is a schematic, cross-sectional view of another example of a free standing porous interlayer including a porous electronic component and the negatively charged lithium ion conducting component bound thereto.

Referring now to FIGS. 1A and 1B, two examples of the porous interlayer 10 and 10' are schematically depicted. Each of the porous interlayers 10, 10' includes some form of the electronic component 12 or 12', a negatively charged (or chargeable) component 14 interspersed among and bound to the electronic component 12 or 12', and pores 16 or pores 16 and 17. As illustrated, the electronic component 12, 12' is capable of conducting electrons (denoted "e" in FIGS. 1A and 1B) and the negatively charged component 14 is capable of conducting lithium ions (denoted "+" in FIGS. 1A and 1B).

The electronic component 12, 12' may be in any form, such as nanofibers, nanotubes (i.e., a cylindrical nanostructure), hollow spheres, porous materials, or the like. In the example shown in FIG. 1A, the electronic component 12 is a network of nanofibers, nanotubes, or some other structure having a length-to-diameter ratio of up to 132,000,000:1. In the example shown in FIG. 1B, the electronic component 12' is a porous material (e.g., a material having internal pores 17).

The electronic component 12, 12' may be carbon, a conductive polymeric material, or combinations thereof. Examples of suitable carbon electronic components 12, 12' include carbon nanotubes, graphene, microporous carbon, mesoporous carbon, and carbon hollow spheres. Combinations of the various carbon electronic components 12, 12' may also be used. The graphene may be used in any suitable form, such as preformed sheets, nanoparticles, fibers, or any other commercially available form. Examples of suitable electrically conductive polymers include polyacetylene, polyphenylene vinylene, polypyrrole, polythiophene, polyaniline, and polyphenylene sulfide. Combinations of the various electrically conductive polymers may also be used. In an example, the conductive polymeric material 12, 12' includes nanofibers, nanotubes, hollow spheres, or combinations thereof made of any of the previously listed conductive polymers. The carbon hollow spheres or the conductive polymeric hollow spheres may have a particle size ranging from about 1 nm to about 100 μm.

The porous interlayer 10, 10' also includes the negatively charged or chargeable component 14. As illustrated in FIGS. 1A and 1B, the component 14 is negatively charged. When forming the porous interlayer 10, 10', it is to be understood that a negatively charged polymer or a negatively chargeable polymer may be used. The negatively charged polymers that are used in the examples disclosed herein are inherently negatively charged and lithium ion conductive. Examples of this type of polymer include polysulfone based-, polyether based-, or polysiloxane based-single lithium ion conductive polymers. In contrast, the negatively chargeable polymers are not inherently negatively charged or lithium ion conductive. Rather, these negatively chargeable polymers i) dissociate into negatively charged polymer backbones and cations in the electrolyte of the lithium-sulfur battery, and ii) become lithium ion conductive through ion exchange with lithium ions in the electrolyte. Examples of the negatively chargeable polymers include a sulfonated tetrafluoroethylene based fluoropolymer-copolymer (which is commercially available under the tradename NAFION®, E.I. Du Pont de Nemours and Co. Corp.), polyacrylic acid, or sodium alginate.

Whether the charged component or the chargeable component is used to form the porous interlayer 10, 10', it is to be understood that when the porous interlayer 10, 10' is used in the lithium-sulfur battery, the component 14 is or becomes negatively charged and lithium ion conducting. This negatively charged component 14 is capable of conducting lithium ions and is also capable of repelling polysulfides.

The pores 16 or pores 16 and 17 may also contribute to the lithium ion conducting properties and the polysulfide ion blocking properties of the porous interlayer 10, 10'. For example, the pores 16 or pores 16 and 17 may be sized i) to allow the lithium ions to pass through, and ii) to trap the polysulfide ions and prevent them from passing through. In an example, the porosity of the porous interlayer 10, 10' is greater than 0% and is equal to or less than 50%. In another example, the porosity of the porous interlayer 10, 10' ranges from about 10% to about 40%. The porosity of the porous interlayer 10, 10' may depend, at least in part, on the thickness of the porous interlayer 10, 10'. In general, it is believed that the thicker the porous interlayer 10, 10', the greater blocking effect the porous interlayer 10, 10' has due, at least in part, to the larger amount of trapping/blocking sites (i.e., pores 16 or pores 16 and 17).

The thickness of the porous interlayer 10, 10' may range from 10 nm to about 1000 μm.

It is believed that any amount of the two components (i.e., the electronic component 12, 12' and the negatively charged or chargeable component 14) may be used to form the porous interlayer 10, 10'. The ratio of the electronic component 12, 12' to the negatively charged or chargeable component 14 may range anywhere from 1:99 to 99:1. In an example, the porous interlayer 10, 10' includes 5 wt % or less of the negatively charged or chargeable component 14 and 95 wt % or more of the electronic component 12, 12'.

Figure 3:
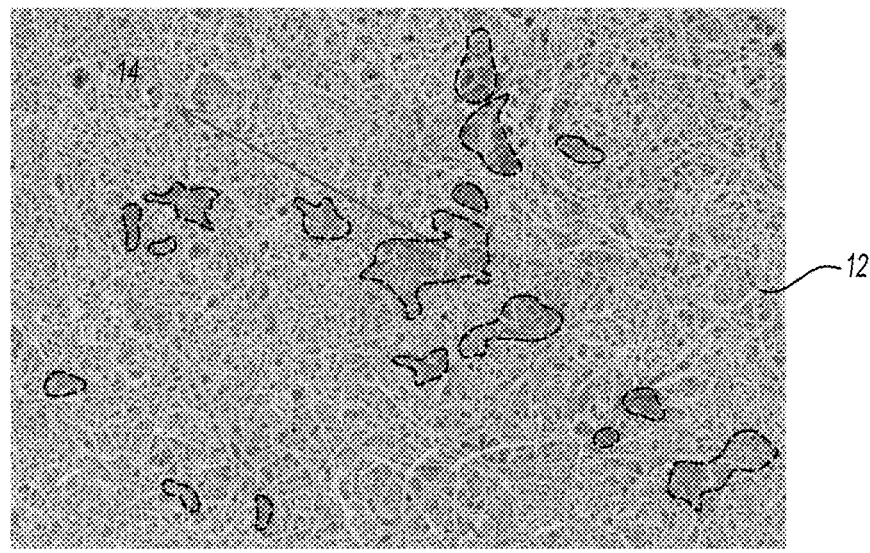
FIG. 3 is a scanning electron microscope (SEM) image of an example of the free standing porous interlayer formed with carbon nanotubes and a negatively chargeable sulfonated tetrafluoroethylene based fluoropolymer-copolymer.

The porous interlayer 10, 10' may be formed as a free standing film (as shown in FIGS. 1A, 1B, and 3) or may be formed on a surface of a porous polymer membrane (as shown in FIG. 2). Examples of the methods for making these structures will now be described.

In an example of the method, two different dispersions are prepared and are exposed separately to a porous support structure. Examples of the porous support structure include a polytetrafluoroethylene (PTFE) film, a polyethylene (PE) membrane, a polypropylene (PP) membrane, a membrane including a blend of PE and PP, multi-layered structured porous films of PE and PP, polyamides (Nylons), polycarbonate, or porous ceramics. Commercially available porous polymer membranes that are suitable for the porous support structure include single layer polypropylene membranes, such as CELGARD 2400, CELGARD 2500, and CELGARD 2325 from Celgard, LLC (Charlotte, N.C.). When the free standing porous interlayer 10, 10' is to be formed, the PTFE porous support structure may be desirable because it can be readily removed from the porous interlayer 10, 10'. When the porous interlayer 10, 10' coating is to be formed, any of the listed membranes or materials may be desirable support structures because these membranes and films can remain in the separator that is formed.

In this example of the method, one of the dispersions includes the electronic component 12 and a first liquid, such as chloroform, methanol, tetrahydrofuran, etc. In an example, 20 mg of carbon nanotubes are dispersed in 20 mL of chloroform under ultrasonication at room temperature (e.g., ranging from about 18° C. to about 25° C.). The electronic component 12, 12' may be added to the first liquid and the stirred to form the dispersion. The dispersion may be poured into the porous support structure. As the first liquid filters through the pores of the porous support structure, the electronic component 12, 12' will remain on the surface.

In this example of the method, the other of the dispersions includes the negatively charged or chargeable component 14 and a second liquid, such as methanol. As an example, 20 mL of 0.5 wt % NAFION® in methanol may be used as the second dispersion. The negatively charged or chargeable component 14 may be added to the second liquid and the stirred to form the other dispersion. The other dispersion may be poured into the porous support structure having the electronic component 12, 12' thereon. As the second liquid filters through the pores of the porous support structure, the negatively charged or chargeable component 14 will remain on the surface and bind to the electronic component 12, 12'.

The porous support structure may then be removed, resulting in the formation of the free standing interlayer 10, 10'. Alternatively, the porous support structure may be allowed to remain, resulting in a coating of the interlayer 10, 10' formed on the porous support structure. This latter example forms a separator that includes the porous interlayer 10, 10'.

In another example of the method, a single dispersion is prepared. In one example, separate dispersions respectively containing a liquid and the electronic component 12, 12', and a liquid and the negatively charged or chargeable component 14 are prepared first, and then are mixed together to form the single dispersion. In another example, a single liquid is used and the electronic component 12, 12' and the negatively charged or chargeable component 14 are both added to the single liquid. Any of the liquids previously described may be used.

The single dispersion may be poured into the porous support structure. As the liquid filters through the pores of the porous support structure, the electronic component 12, 12' and a portion of the negatively charged or chargeable component 14 will remain on the surface of the porous support structure. In these examples, the negatively charged or chargeable component 14 may bind to the electronic component 12, 12' within the single dispersion.

In this example of the method, the porous support structure may then be removed, resulting in the formation of the free standing porous interlayer 10, 10'. Alternatively, the porous support structure may be allowed to remain, resulting in a coating of the porous interlayer 10, 10' formed on the porous support structure.

In either example of the method, it is to be understood that the pouring of the dispersion(s) may be repeated as many times as is desirable in order to increase the thickness of the porous interlayer 10, 10'.

It is also to be understood that when the porous support structure remains in contact with the porous interlayer 10, 10' to form a separator, some of the electronic component 12, 12' and the negatively charged or chargeable component 14 may penetrate the outermost pores of the porous support structure.

Referring now to FIG. 2, an example of the lithium-sulfur battery 20 is depicted including an example of the porous interlayer 10, 10' disclosed herein. In this example, the separator 27 of the battery 20 includes a porous polymer membrane 26 (which is also, in this example, the porous support structure used in the method) and the porous interlayer 10, 10' formed as a porous coating on a surface thereof. As illustrated, the separator 27 is positioned within the lithium-sulfur battery so that the porous interlayer 10, 10' faces a positive electrode 24. The separator 27, which operates as both an electrical insulator and a mechanical support, is sandwiched between a negative electrode 22 and the positive electrode 24 to prevent physical contact between the two electrodes 22, 24 and to prevent the occurrence of a short circuit.

While not shown, it is to be understood that in another example of the lithium-sulfur battery 20, the free standing porous interlayer 10, 10' is not attached to the porous polymer membrane 26 but rather is a free standing film that is positioned between the porous polymer membrane 26 and the positive electrode 24. In this other example, any porous polymer membrane 26 that functions as a separator may be used.

As shown in FIG. 2, the lithium-sulfur battery 20 includes the negative electrode 22, the positive electrode 24, and the separator 27 positioned between the negative electrode 22 and the positive electrode 24. The lithium-sulfur battery 20 also includes an interruptible external circuit 28 that connects the negative electrode 22 and the positive electrode 24.

Each of the negative electrode 22, the positive electrode 24, and the separator 27 (including the porous interlayer 10, 10') are soaked in an electrolyte solution that is capable of conducting lithium ions. As previously discussed, when the negatively chargeable component 14 is used the electrolyte also renders the component 14 negatively charged and lithium conductive. The presence of the electrolyte solution may also provide a larger contact surface for lithium ion transport and may enhance the conductivity of the positive electrode 24. While the polysulfides may dissolve in the electrolyte at the positive electrode 24, they are prevented from passing through the separator 27 due to the porous interlayer 10, 10'.

Any appropriate electrolyte solution that can conduct lithium ions between the negative and positive electrode 22, 24 may be used in the lithium-sulfur battery 20. In one example, the non-aqueous electrolyte solution may be an ether based electrolyte that is stabilized with lithium nitrate. Other non-aqueous liquid electrolyte solutions may include a lithium salt dissolved in an organic solvent or a mixture of organic solvents. Examples of lithium salts that may be dissolved in the ether to form the non-aqueous liquid electrolyte solution include $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(FSO_2)_2$, $LiN(CF_3SO_2)_2$, $LiAsF_6$, $LiPF_6$, and mixtures thereof. The ether based solvents may be composed of cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof.

The negative electrode 22 may include any lithium host material that can sufficiently undergo lithium plating and stripping while functioning as the negative terminal of the lithium-sulfur battery 20. The negative electrode 22 may also be a silicon-based material that is prelithiated. For lithium ion cells, the negative electrode 22 may also include a polymer binder material to structurally hold the lithium host material together. For example, the negative electrode 22 may be formed of an active material, made from graphite or a low surface area amorphous carbon, intermingled with a binder, made from polyvinylidene fluoride (PVdF), an ethylene propylene diene monomer (EPDM) rubber, sodium alginate, or carboxymethyl cellulose (CMC). These materials may be mixed with a high surface area carbon, such as acetylene black, to ensure electron conduction between a current collector 22a and the active material particles of the anode 22. Graphite is widely utilized to form the negative electrode because it exhibits reversible lithium intercalation and deintercalation characteristics, is relatively non-reactive, and can store lithium in quantities that produce a relatively high energy density. Commercial forms of graphite that may be used to fabricate the anode 22 are available from, for example, Timcal Graphite & Carbon (Bodio, Switzerland), Lonza Group (Basel, Switzerland), or Superior Graphite (Chicago, Ill.). Other materials can also be used to form the negative electrode including, for example, lithium titanate. The negative-side current collector 22a may be formed from copper or any other appropriate electrically conductive material known to skilled artisans.

The positive electrode 24 of the lithium-sulfur battery 20 may be formed from any sulfur-based active material that can sufficiently undergo lithiation and delithiation while functioning as the positive terminal of the lithium-sulfur battery 20. Examples of sulfur-based active materials include $S_8$, $Li_2S_8$, $Li_2S_6$, $Li_2S_4$, $Li_2S_2$, and $Li_2S$. The positive electrode 24 may also include a polymer binder material to structurally hold the sulfur-based active material together. The polymeric binder may be made of at least one of polyvinylidene fluoride (PVdF), polyethylene oxide (PEO), an ethylene propylene diene monomer (EPDM) rubber, or carboxymethyl cellulose (CMC)). The positive-side current collector 14a may be formed from aluminum or any other appropriate electrically conductive material known to skilled artisans.

The negative-side current collector 22a and the positive-side current collector 24a may be positioned in contact with the negative electrode 22 and the positive electrode 24, respectively, to collect and move free electrons to and from the external circuit 28.

The lithium-sulfur battery 20 may support a load device 30 that can be operatively connected to the external circuit 28. The load device 30 receives a feed of electrical energy from the electric current passing through the external circuit 28 when the lithium-sulfur battery 20 is discharging. While the load device 22 may be any number of known electrically-powered devices, a few specific examples of a power-consuming load device include an electric motor for a hybrid vehicle or an all-electrical vehicle, a laptop computer, a cellular phone, and a cordless power tool. The load device 22 may also, however, be an electrical power-generating apparatus that charges the lithium-sulfur battery 20 for purposes of storing energy. For instance, the tendency of windmills and solar panels to variably and/or intermittently generate electricity often results in a need to store surplus energy for later use.

The lithium-sulfur battery 20 can include a wide range of other components that, while not depicted here, are nonetheless known to skilled artisans. For instance, the lithium-sulfur battery 20 may include a casing, gaskets, terminals, tabs, and any other desirable components or materials that may be situated between or around the negative electrode 22 and the positive electrode 24 for performance-related or other practical purposes. Moreover, the size and shape of the lithium-sulfur battery 20, as well as the design and chemical make-up of its main components, may vary depending on the particular application for which it is designed. Battery-powered automobiles and hand-held consumer electronic devices, for example, are two instances where the lithium-sulfur battery 20 would most likely be designed to different size, capacity, and power-output specifications. The lithium-sulfur battery 20 may also be connected in series and/or in parallel with other similar lithium-sulfur batteries 20 to produce a greater voltage output and current (if arranged in parallel) or voltage (if arranged in series) if the load device 20 so requires.

The lithium-sulfur battery 20 can generate a beneficial electric current during battery discharge (shown by reference numeral 21 in FIG. 2). During discharge, the chemical processes in the battery 20 include delithiation from the surface of the negative electrode 22 and incorporation of the lithium cations into alkali metal polysulfide salts (i.e., $Li_2S_x$). As such, lithium polysulfides are formed (sulfur is reduced) on the surface of the positive electrode 24 in sequence (e.g., $S_8$, $Li_2S_8$, $Li_2S_6$, $Li_2S_4$, $Li_2S_3$, $Li_2S_2$, $Li_2S$) while the battery 20 is discharging. The chemical potential difference between the positive electrode 24 and the negative electrode 22 (ranging from approximately 1.5 to 3.0 volts, depending on the exact chemical make-up of the electrodes 22, 24) drives electrons produced by the delithiation at the negative electrode 22 through the external circuit 28 towards the positive electrode 24. The resulting electric current passing through the external circuit 28 can be harnessed and directed through the load device 30 until the lithium in the negative electrode 22 is depleted and the energy of the lithium-sulfur battery 20 is diminished.

The lithium-sulfur battery 20 can be charged at any time by applying an external charger to the lithium-sulfur battery 20 to reverse the electrochemical reactions that occur during battery discharge. During charging (shown at reference numeral 23 in FIG. 2), lithium plating to the negative electrode 22 takes place and sulfur formation at the positive electrode 24 takes place. The connection of an external charger to the lithium-sulfur battery 20 compels the otherwise non-spontaneous oxidation of lithium sulfides at the positive electrode 24 to produce electrons and free lithium cations. The electrons, which flow back towards the negative electrode 22 through the external circuit 28, and the lithium ions ($Li^+$), which are carried by the electrolyte across the 27 back towards the negative electrode 22, reunite at the negative electrode 22, and replenish the negative electrode 22 with lithium for consumption during the next battery discharge cycle. The external charger that may be used to charge the lithium-sulfur battery 20 may vary depending on the size, construction, and particular end-use of the lithium-sulfur battery 20. Some suitable external chargers include a battery charger plugged into an AC wall outlet and a motor vehicle alternator.

To further illustrate the present disclosure, examples are given herein. It is to be understood that these examples are provided for illustrative purposes and are not to be construed as limiting the scope of the present disclosure.

Example 1

An example of the free standing porous interlayer was prepared using carbon nanotubes and NAFION®. A dispersion of carbon nanotubes was made in chloroform under ultrasonication, and the dispersion was poured through a PTFE support structure. A second dispersion of NAFION® in methanol was then filtered through the PTFE support structure. The structure was allowed to dry. The PTFE support structure was peeled away, leaving the free standing porous interlayer shown in FIG. 3 (which is a SEM image). This porous interlayer included less than 5 wt % of the NAFION®. The average aperture/pore size of this porous interlayer was sub-micron and the thickness was about 50 µm. Energy dispersive X-ray spectroscopy was used to identify the NAFION®, which is marked in FIG. 3.

Example 2

Three coin cells (i.e., half cells) were prepared. Each of the coin cells were composed of a lithium metal anode, a porous separator, and a sulfur cathode. The first comparative coin cell included no porous interlayer (referred to as "Comparative Example 1" or "1"). The second comparative coin cell included a 50 µm-thick carbon nanofiber porous interlayer between the sulfur cathode and the porous separator (referred to as "Comparative Example 2" or "2"). The third example coin cell included the example of the porous interlayer formed in Example 1 between the sulfur cathode and the porous separator (referred to as "Example 3" or "3").

The coin cells were assembled in an argon-filled glove box. The electrolyte was 1M LiTFSI salt in dioxolane/1,2-dimethoxyethane (DIOX:DME) plus 2 wt. % LiNO$_3$. Galvanostatic charge and discharge cycle tests were carried out at 25° C. between 2.85 V and 1.5 V.

Figure 4:
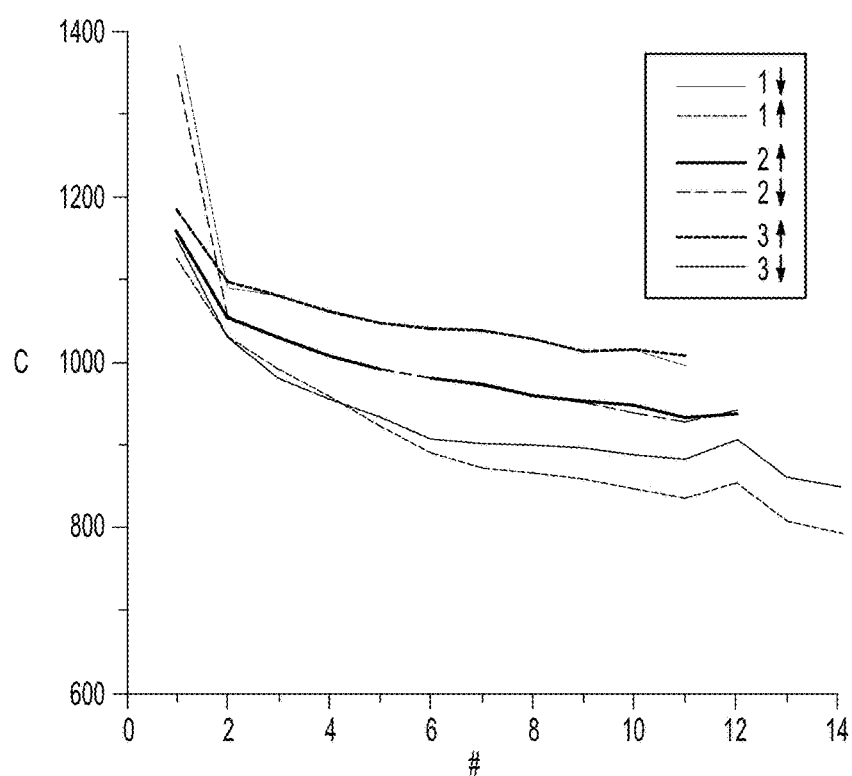
FIG. 4 is a graph illustrating the charge capacity and discharge capacity ($mAh/g_S$) for comparative battery cells including no interlayer or a carbon interlayer, and for an example battery cell including an interlayer according to the present disclosure.

FIG. 4 illustrates the charge (↑) and discharge (↓) curves for each of the comparative examples 1 and 2 and example 3. As illustrated, example 3 (including the electronic and ionic conducting porous interlayer disclosed herein) illustrated the best charge and discharge capacity (C in FIG. 4, mAh/g$_S$) with a desirable cycle time (# in FIG. 4). While comparative examples 1 and 2 exhibited desirably long cycle times, the charge and discharge capacities were much worse than example 3. As such, these results indicate that the porous interlayer disclosed herein significantly improves the cycling stability.

Figure 5:
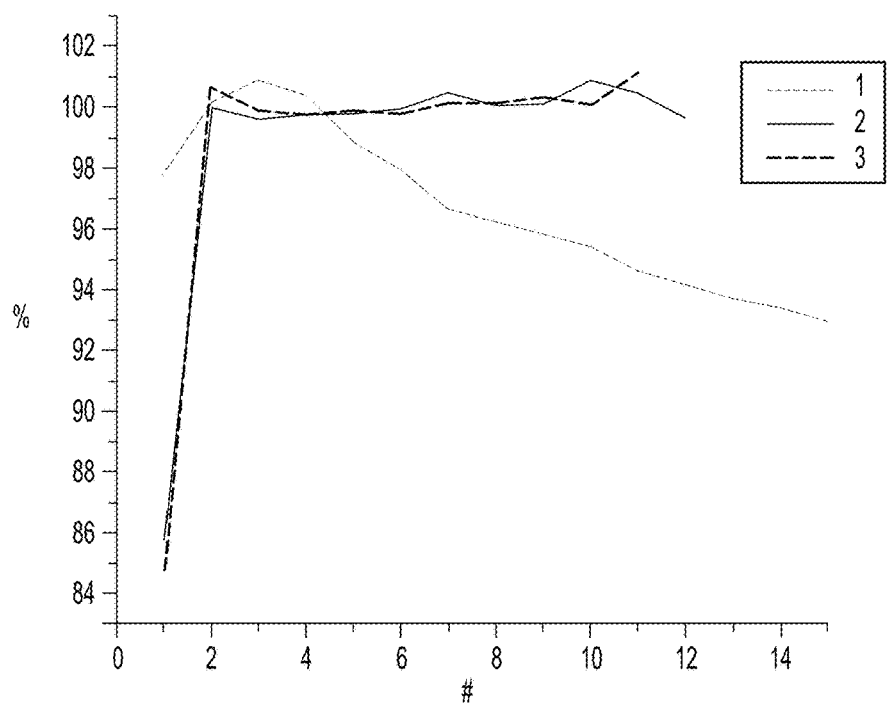
FIG. 5 a graph illustrating the Coulombic efficiency (%) for the comparative battery cells including no interlayer or the carbon interlayer, and for the example battery cell including the example interlayer according to the present disclosure.

FIG. 5 illustrates the Coulombic efficiency (%) of comparative examples 1 and 2 and example 3 at the various cycles (#). The high Coulombic efficiency exhibited by example 3 indicates that the polysulfide shuttling can be effectively suppressed by the porous interlayer disclosed herein.

Figure 6:
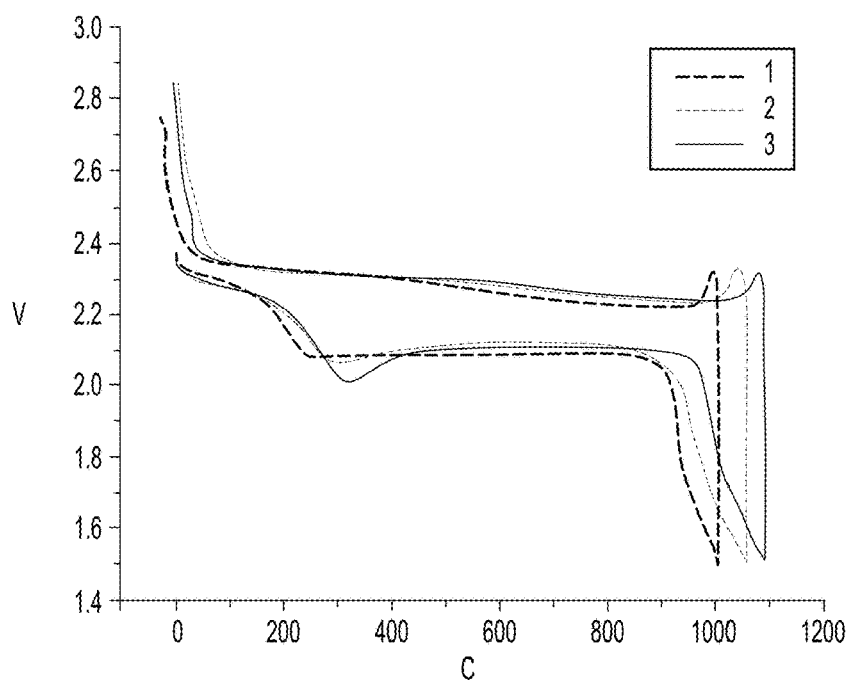
FIG. 6 is a graph depicting the voltage (V) profile in the $2^{nd}$ cycle for the comparative battery cells including no interlayer or the carbon interlayer, and for the example battery cell including the example interlayer according to the present disclosure.

FIG. 6 illustrates the voltage profile (i.e., voltage, V, versus capacity, C (mAh/g$_S$)) for the second cycle of each of comparative examples 1 and 2 and example 3. From these results, it can be concluded that the inclusion of the porous interlayer in example 3 maintains the plateau voltage and improves the utilization of active materials, which results in a higher energy density.

It is to be understood that the ranges provided herein include the stated range and any value or sub-range within the stated range. For example, a range of 5 wt % or less should be interpreted to include not only the explicitly recited limits of 5 wt % or less, but also to include individual values, such as 4.75 wt %, 3 wt %, 2.3 wt %, etc., and sub-ranges, such as from about 0.5 wt % to about 4.5 wt %; from about 1 wt % to about 3.5 wt %, etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for making a porous interlayer for a lithium-sulfur battery, the method comprising;
   dispersing an electronic component selected from a carbon material, a conductive polymeric material, and combinations thereof in a first liquid to form a first dispersion;
   exposing a porous support structure to the first dispersion, whereby the electronic component remains on a surface of the porous support structure and the first liquid filters through the porous support structure;
   dispersing a negatively charged or chargeable lithium ion conducting component in a second liquid to form a second dispersion; and
   exposing the porous support structure to the second dispersion, whereby the negatively charged or chargeable lithium ion conducting component remains on the surface of the porous support structure and the second liquid filters through the porous support structure.

2. The method as defined in claim 1 wherein the method further comprises: mixing the first and second dispersions to form a single dispersion; and
   wherein the exposing steps are accomplished simultaneously by exposing the porous support structure to the single dispersion.

3. The method as defined in claim 1 wherein the porous support structure is a polytetrafluoroethylene film, a polyethylene (PE) membrane, a polypropylene (PP) membrane, a membrane including a blend of PE and PP, or multi-layered structured porous films of PE and PP.

4. The method as defined in claim 1 wherein the porous support structure is a porous polymer membrane, and the method further comprises allowing the porous polymer membrane to remain in contact with the electronic component and the negatively charged or chargeable lithium ion conducting, thereby forming a separator with the porous interlayer as a coating on the porous polymer membrane.

5. The method as defined in claim 4 wherein the porous interlayer coating consists of:
   the electronic component;
   the negatively charged lithium ion conducting component; and
   the electrolyte filing pores of the porous polymer separator and the porous interlayer coating.

6. The method as defined in claim 4 wherein a percentage of the negatively charged lithium ion conducting component in the porous interlayer coating is 5 wt. % or less of a total wt. % of the porous interlayer coating.

7. The method as defined in claim 1 wherein the carbon material is selected from carbon nanotubes, graphene, microporous carbon, mesoporous carbon, hollow carbon spheres, and combinations thereof; or
   the conductive polymeric material includes nanofibers, nanotubes, hollow spheres, or combinations thereof, the conductive polymeric material being made of polypyrrole, polythiophene, or polyaniline.

8. The method as defined in claim 1 wherein the negatively charged lithium ion conducting component is selected from negatively charged sulfonated tetrafluoroethylene based fluoropolymer-copolymer, negatively charged polyacrylic acid, negatively charged sodium alginate, or a single lithium ion conductive polymer.

9. A method for making a porous interlayer for a lithium-sulfur battery, the method comprising;
   dispersing an electronic component for conducting electrons in the lithium-sulfur battery selected from a carbon material, a conductive polymeric material, and combinations thereof in a first liquid to form a first dispersion;

exposing a porous support structure to the first dispersion, whereby the electronic component remains on a surface of the porous support structure and the first liquid filters through the porous support structure;

dispersing a negatively charged or chargeable lithium ion conducting component for conducting lithium ions while repelling polysulfides in the lithium-sulfur battery in a second liquid to form a second dispersion; and exposing the porous support structure to the second dispersion, whereby the negatively charged or chargeable lithium ion conducting component remains on the surface of the porous support structure and the second liquid filters through the porous support structure to form the porous interlayer for the lithium-sulfur battery that conducts electrons and lithium ions and repels polysulfides.

10. The method as defined in claim 9 wherein the porous support structure is a polytetrafluoroethylene film, a polyethylene (PE) membrane, a polypropylene (PP) membrane, a membrane including a blend of PE and PP, or multi-layered structured porous films of PE and PP.

11. The method as defined in claim 9 wherein the porous support structure is a porous polymer membrane, and the method further comprises allowing the porous polymer membrane to remain in contact with the electronic component and the negatively charged or chargeable lithium ion conducting, thereby forming a separator with the porous interlayer as a coating on the porous polymer membrane.

12. The method as defined in claim 11 wherein a percentage of the negatively charged lithium ion conducting component in the porous interlayer coating is 5 wt. % or less of a total wt. % of the porous interlayer coating.

13. The method as defined in claim 9 wherein the carbon material is selected from carbon nanotubes, graphene, microporous carbon, mesoporous carbon, hollow carbon spheres, and combinations thereof; or the conductive polymeric material includes nanofibers, nanotubes, hollow spheres, or combinations thereof, the conductive polymeric material being made of polypyrrole, polythiophene, or polyaniline.

14. The method as defined in claim 9 wherein the negatively charged lithium ion conducting component is selected from negatively charged sulfonated tetrafluoroethylene based fluoropolymer-copolymer, negatively charged polyacrylic acid, negatively charged sodium alginate, or a single lithium ion conductive polymer.

* * * * *